(12) United States Patent
Sato

(10) Patent No.: US 7,976,687 B2
(45) Date of Patent: Jul. 12, 2011

(54) ROLL UNIT DIPPED IN SURFACE TREATMENT LIQUID

(75) Inventor: Haruo Sato, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 205 days.

(21) Appl. No.: 12/521,167

(22) PCT Filed: Dec. 11, 2007

(86) PCT No.: PCT/JP2007/073819
§ 371 (c)(1),
(2), (4) Date: Jun. 25, 2009

(87) PCT Pub. No.: WO2008/081689
PCT Pub. Date: Jul. 10, 2008

(65) Prior Publication Data
US 2010/0051451 A1  Mar. 4, 2010

(30) Foreign Application Priority Data

Dec. 28, 2006 (JP) ................................. 2006-353918

(51) Int. Cl.
 C25B 9/00 (2006.01)
 C25C 7/00 (2006.01)
 C25D 17/00 (2006.01)
(52) U.S. Cl. ........ 204/279; 384/535; 384/543; 384/546; 384/565; 384/618; 384/619; 384/46; 384/50; 384/51; 384/54; 72/199; 72/252.2; 492/42; 492/48
(58) Field of Classification Search .................. 204/279; 72/199, 252.2; 492/42, 48; 384/535, 543, 384/546, 565, 618, 619, 46, 50, 51, 54
See application file for complete search history.

(56) References Cited

U.S. PATENT DOCUMENTS

| 3,910,833 A | * | 10/1975 | Knighton | ...... 204/273 |
| 6,287,014 B1 | * | 9/2001 | Salla | ............ 384/546 |
| 6,517,690 B2 | * | 2/2003 | Ko | ............... 204/279 |

(Continued)

FOREIGN PATENT DOCUMENTS

JP  05-237523 A  9/1993

(Continued)

*Primary Examiner* — Bruce F Bell
(74) *Attorney, Agent, or Firm* — Howson & Howson LLP

(57) ABSTRACT

Provided is a roll unit to be dipped in a surface treatment liquid of a copper foil, wherein a bearing box for housing a roll shaft is configured from two bearing boxes that are divisible, one of the bearing boxes is configured from a roll-side bearing box arranged on a roll main body-side and the other bearing box is configured from a shaft end-side bearing box arranged on the shaft end-side of the roll, a shaft sleeve covering an outer periphery of the roll shaft is provided in the roll-side bearing box and an oil seal is provided along an outer periphery of the shaft sleeve, and a bearing for rotatably supporting the shaft is disposed in the shaft end-side bearing box. Specifically, the present invention provides a roll unit to be used in electrochemical surface treatments such as roughening treatment, rust prevention treatment, and oxidized surface treatment (blackening treatment) to be continuously performed on a surface of a rolled copper foil or an electrolytic copper foil, and which is capable of inhibiting the abrasion and corrosion of the roll shaft of such roll unit by controlling the corrosion caused by the infiltration of the treatment liquid, and which enables the simple replacement of the bearing box, bearing, and other components.

7 Claims, 2 Drawing Sheets

U.S. PATENT DOCUMENTS

2010/0018273 A1 * 1/2010 Sato .............................. 72/199

FOREIGN PATENT DOCUMENTS

| | | |
|---|---|---|
| JP | 08-159163 A | 6/1996 |
| JP | 09-177797 A | 7/1997 |
| JP | 10-238541 A | 9/1998 |
| JP | 11-108066 A | 4/1999 |
| JP | 2000-130569 A | 5/2000 |
| JP | 2002-235761 A | 8/2002 |
| JP | 2005-068512 A | 3/2005 |
| JP | 2005-126779 A | 5/2005 |
| JP | 2006-046449 A | 2/2006 |

* cited by examiner

[Figure 2]
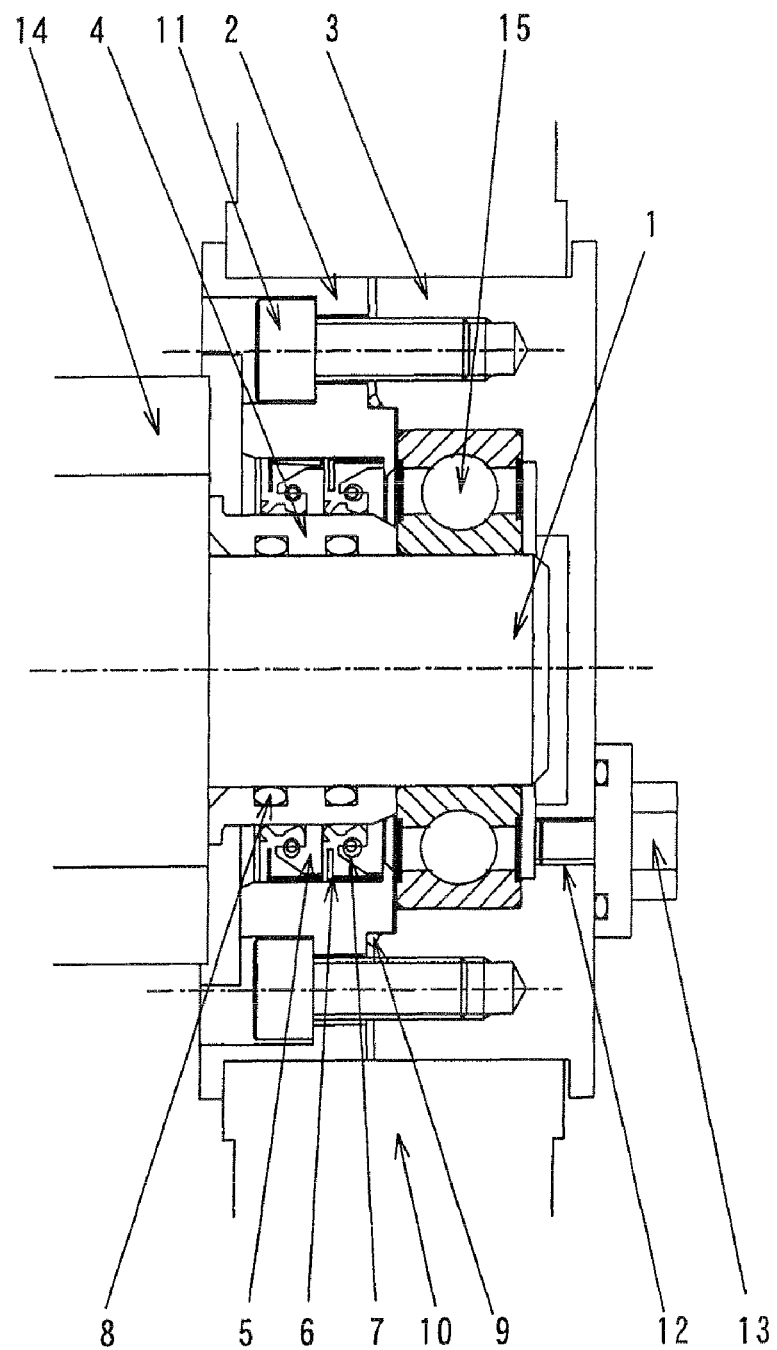

ROLL UNIT DIPPED IN SURFACE TREATMENT LIQUID

BACKGROUND OF THE INVENTION

The present invention relates to a roll unit to be used in electrochemical surface treatments such as roughening treatment, rust prevention treatment, and oxidized surface treatment (blackening treatment) to be continuously performed on a surface of a rolled copper foil or an electrolytic copper foil, and in particular relates to a roll unit to be dipped in a surface treatment liquid.

In recent years, copper foil is being widely used in the manufacture of electronic components, wiring substrates and the like.

Generally speaking, an electrolytic copper foil is manufactured by using a rotating metal cathode drum and an insoluble metal anode (positive electrode) arranged at a position that is roughly at the lower half of the cathode drum and which surrounds the periphery of such cathode drum, electrodepositing copper on the cathode drum by flowing copper electrolyte between the cathode drum and the anode and applying a potential therebetween, and, upon achieving a prescribed thickness, peeling the electrodeposited copper from the cathode drum to continuously manufacture the copper foil.

In addition, the rolled copper foil is manufactured by repeatedly subjecting a melted and cast ingot to rolling and annealing a plurality of times.

As described above, the electrolytic copper foil and the rolled copper foil are continuously manufactured by being winded around a coil, and the obtained copper foils are used in a printed wiring board and the like by subsequently being subject to several chemical or electrochemical surface treatments.

Generally speaking, the electrochemical surface treatment of a copper foils is continuously performed by using a unit as shown in FIG. 1. FIG. 1 shows a lateral schematic diagram of a continuous surface treatment unit of a copper foil.

As shown in FIG. 1, a copper foil C winded around a coil (not shown) is continuously passed in front of opposing anodes B and subject to surface treatment via a plurality of upper rolls D arranged inside and outside an electrolytic tank A and a lower roll F. The surface-treated copper foil C is winded around the coil (not shown) once again. E is a guide roll. The lower roll F in the foregoing case is dipped in the surface treatment liquid.

The electrolytic tank is provided with an electrolytic solution for use in treatment such as a plating solution for roughening treatment and rust prevention treatment. The structure enables the circulation of the electrolytic solution that was replenished to or used as the initial make-up of electrolytic bath in the electrolytic tank. Current for surface treatment is flowed between the anode and the copper foil as the cathode.

As the anode, although an insoluble anode such as a Pb plate or a noble metal oxide coated Ti plate is usually used, a soluble anode which itself melts and is electrodeposited on the copper foil may also be used. This may be changed as needed according to the conditions of the electrochemical treatment.

Solutions such as copper sulfate and chromic acid are used in the electrochemical surface treatment, and the foregoing treatment solutions are highly corrosive. With the rolls used under the foregoing circumstances, there is a problem in that the treatment liquid will infiltrate into the bearing, and the bearing in particular is subject to severe abrasion and corrosion. Thus, devices have been made for filling grease into the bearing of the roll so as to inhibit the abrasion and to facilitate the replacement of the roll bearing, but such devices were insufficient.

In addition, although there is also a proposal of filling grease in the bearing as described above and providing an oil seal in order to inhibit the corrosion within the bearing, there was a problem in that the grease would leak from the bearing and flow to the roll main body and contaminate the roll.

In the conventional technology, a double seal structured leak prevention roll referred to as a plummer block is proposed for preventing the leakage of grease to the roll-side of transporting products (refer to Patent Document 1). Nevertheless, with this kind of structure alone it is not possible to prevent the infiltration of the treatment liquid in a corrosion environment, and it is thus unable to overcome the problem that the roll shaft is subject to severe abrasion. [Patent Document 1] Japanese Patent Laid-Open Publication No. H8-159163

SUMMARY OF THE INVENTION

The present invention was devised in view of the foregoing problems, and relates to a roll unit to be used in electrochemical surface treatments such as roughening treatment, rust prevention treatment, and oxidized surface treatment (blackening treatment) to be continuously performed on a surface of a rolled copper foil or an electrolytic copper foil, and in particular relates to a roll unit that is dipped in the surface treatment liquid. An object of the present invention is to provide a roll unit capable of inhibiting the abrasion and corrosion of the roll shaft of such roll unit by controlling the corrosion caused by the infiltration of the treatment liquid, and which enables the simple replacement of the bearing box, bearing, and other components.

In light of the above, the present invention provides:
1. A roll unit to be dipped in a surface treatment liquid of a copper foil, wherein a bearing box for housing a roll shaft is configured from two bearing boxes that are divisible, one of the bearing boxes is configured from a roll-side bearing box arranged on a roll main body-side and the other bearing box is configured from a shaft end-side bearing box arranged on the shaft end-side of the roll, a shaft sleeve covering an outer periphery of the roll shaft is provided in the roll-side bearing box and an oil seal is provided along an outer periphery of the shaft sleeve, and a bearing for rotatably supporting the shaft is disposed in the shaft end-side bearing box.

The present invention additionally provides:
2. The roll unit to be dipped in a surface treatment liquid of a copper foil according to paragraph 1 above, wherein an O-ring for inhibiting infiltration of the surface treatment liquid is provided between an inner peripheral face of the shaft sleeve covering the outer periphery of the roll shaft and an outer peripheral face of the shaft disposed in the roll-side bearing box;
3. The roll unit to be dipped in a surface treatment liquid of a copper foil according to paragraph 1 or paragraph 2 above, wherein the oil seal comprises an inner ring and a spring; and
4. The roll unit to be dipped in a surface treatment liquid of a copper foil according to any one of paragraphs 1 to 3 above, wherein an O-ring for inhibiting infiltration of the surface treatment liquid is provided at a contact surface of the roll-side bearing box and the shaft end-side bearing box.

The present invention further provides:
5. The roll unit to be dipped in a surface treatment liquid of a copper foil according to any one of paragraphs 1 to 4 above, wherein, after assembling the roll-side bearing box and the shaft end-side bearing box on a roll frame, the roll-side bearing box and the shaft end-side bearing box are respectively fixed with a fixing bolt;

6. The roll unit to be dipped in a surface treatment liquid of a copper foil according to any one of paragraphs 1 to 5 above, wherein a plug for discharging air that is trapped within the bearing is provided to a lateral face of the shaft end-side bearing box; and 7. The roll unit to be dipped in a surface treatment liquid of a copper foil according to any one of paragraphs 1 to 6, wherein a lateral face on the roll main body-side of the shaft sleeve is in contact with the roll main body and rotates integrally with the roll shaft.

The present invention yields a superior effect of being able to provide a roll unit to be used in electrochemical surface treatments such as roughening treatment, rust prevention treatment, and oxidized surface treatment (blackening treatment) to be continuously performed on a surface of a rolled copper foil or an electrolytic copper foil, and which is capable of inhibiting the abrasion and corrosion of the roll shaft of such roll unit by controlling the corrosion caused by the infiltration of the treatment liquid, and which enables the simple replacement of the bearing box, bearing, and other components. The present invention also yields a superior effect of improving the productivity of the surface treatment unit.

BRIEF DESCRIPTION OF THE DRAWINGS

FIG. 2 is a cross sectional explanatory diagram of a bearing of a roll unit to be dipped in the surface treatment liquid.

DETAILED DESCRIPTION OF THE INVENTION

Figure 1:
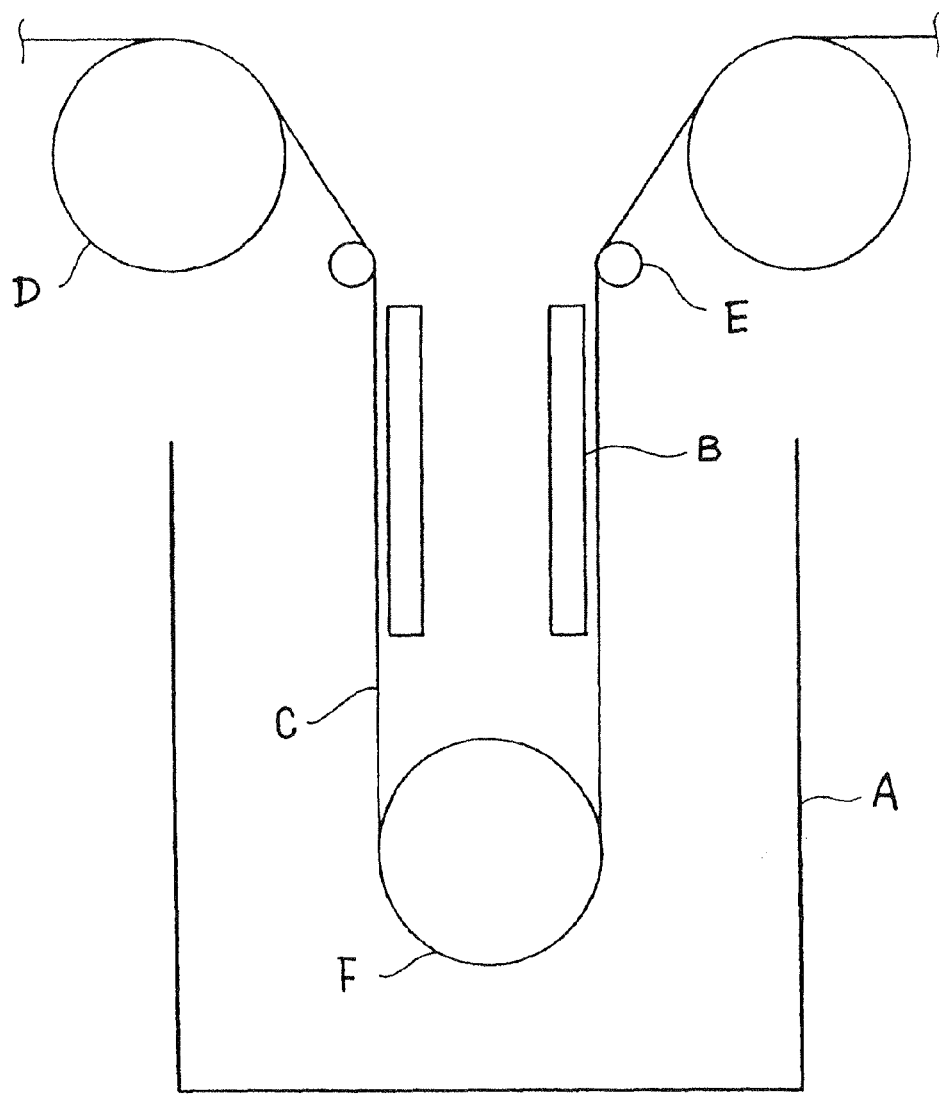
FIG. 1 is a lateral schematic diagram of a continuous surface treatment unit of a copper foil.

A representative example of the present invention is now explained with reference to the attached drawings. Incidentally, the following explanation illustrates a preferred embodiment, and is not intended to limit the present invention in any way. Thus, modifications and other examples and modes included in the technical concept of the present invention provided in the claims and specification are all covered by this invention.

With the roll unit to be dipped in a surface treatment liquid according to the present invention, a bearing box for housing a roll shaft 1 is configured from two bearing boxes that are divisible. One of the bearing boxes is configured from a roll-side bearing box 2 arranged on a roll main body-side and the other bearing box is configured from a shaft end-side bearing box 3 arranged on the shaft end-side of the roll. The bearing box is usually configured from heat-resistant vinyl chloride. Other materials may also be used so as long as they are heat-resistant resin.

A shaft sleeve 4 covering an outer periphery of the roll shaft 1 is provided in the roll-side bearing box 2 and an oil seal 5 is provided to an outer periphery of the shaft sleeve 4, and a bearing 15 for rotatably supporting the roll shaft 1 is disposed in the shaft end-side bearing box 3. Since the roll shaft 1 and the oil seal 5 do not come into direct contact with the use of the shaft sleeve 4, it is possible to prevent the roll shaft 1 from being subject to abrasion. The oil seal 5 arranged at the outer periphery of the shaft sleeve 4 may be configured from Viton or rubber such as nitrile rubber. In particular, Viton is used for an acidic plating solution and nitrile is used for an alkali plating solution.

The oil seal 5 may be provided in a plurality. The oil seal 5 prevents the surface treatment liquid from penetrating to the bearing 15 that is supporting the rotation of the roll shaft 1, and inhibits the abrasion of the roll shaft and other components.

An O-ring 8 provided between an inner peripheral face of the shaft sleeve 4 covering the outer periphery of the roll shaft 1 and an outer peripheral face of the shaft disposed in the roll-side bearing box is able to inhibit infiltration of the surface treatment liquid effectively. It is also effective for the oil seal comprise an inner ring and a spring. The oil seal can thereby be ensured even further.

As the material of the inner ring 6 and the spring 7 of the oil seal, stainless (SUS316) is preferably used. However, other materials may also be used so as long as they possess adequate strength and corrosion resistance. Moreover, an O-ring 9 for effectively inhibiting infiltration of the surface treatment liquid is provided at a contact surface of the roll-side bearing box 2 and the shaft end-side bearing box 3.

After assembling the roll-side bearing box 2 and the shaft end-side bearing box 3 on a roll frame 10, the roll-side bearing box 2 and the shaft end-side bearing box 3 may be respectively fixed with a fixing bolt 11.

In addition, a plug 12 for discharging air that is trapped within the bearing is provided to a lateral face of the shaft end-side bearing box 3. The plug 12 comprises a stainless (SUS316) plug cap 13, and an O-ring is sealed at the location that this plug 12 is provided to prevent the infiltration of the surface treatment liquid.

A lateral face on the roll main body-side of the shaft sleeve 4 is in contact with the roll main body 13 and rotates integrally with the roll shaft 1. As a result of this contact, the displacement of the roll main body 14 in the shaft direction can be prevented.

Upon replacing the bearing, by removing the roll shaft 1 together with the shaft sleeve 4 from the roll-side bearing box 2 and the shaft end-side bearing box 3, and then removing the fixing bolt 11 of the bearing box, the fixation of the roll-side bearing box 2 and the shaft end-side bearing box 3 is released, and the shaft end-side bearing box 3 and the roll-side bearing box 2 can be easily removed from the frame 10.

As a result of releasing the roll-side bearing box 2 and the shaft end-side bearing box 3, the O-ring 9 can be replaced. In addition, the oil seal 5 (including the inner ring 6 and spring 7) that is housed in the roll-side bearing box 2 can also be replaced. Similarly, the bearing 15 housed in the shaft end-side bearing box 3 can be replaced. The shaft sleeve 4 and the oil seal 8 can be replaced by removing the shaft sleeve 4 from the roll shaft 1.

Although the foregoing embodiment explained a case of removing the components upon replacing such component, the components can also be assembled by performing the reverse operation.

As described above, the roll unit of the present invention not only inhibits abrasion and corrosion effectively, but also yields a superior effect of being able to shorten the time required to replace the bearing and other components.

The copper foil (work piece) to be used in the present invention may be either an electrolytic copper foil or a rolled copper foil. It is obvious that there is no limitation in the thickness of the copper foil. As the type of surface treatment to be performed, all types of electrochemical treatments including the roughening treatment for forming a particle bed by way of plating or the like, coat plating, rust prevention treatment including chromium and/or zinc after the plate processing, blackening treatment and the like may be performed. The present invention can be applied to all roll units that need to inhibit the abrasion and corrosion of the roll shaft and bearing of the roll unit that is dipped in a corrosive surface treatment liquid.

The present invention is able to seek the protection of the bearing of a roll unit to be dipped in a surface treatment liquid of a copper foil upon manufacturing a surface-treated copper foil, and to thereby prolong the life of the bearing, and yields the effect of shortening the time required for replacing the roll or bearing. In addition, with the use of a shaft sleeve, it is possible to prevent the roll shaft and the rubber seal from coming into direct contact, prevent the abrasion of the roll shaft, and prevent the displacement of the roll in the shaft direction. Accordingly, the present invention is able to improve the productivity, and is useful as a roll unit for performing electrochemical continuous surface treatments such as roughening treatment, rust prevention treatment, oxidized surface treatment (blackening treatment) to be performed to the surface of the rolled copper foil or the electrolytic copper foil.

The invention claimed is:

1. A roll unit to be dipped in a surface treatment liquid of a copper foil, comprising: a bearing box for housing a roll shaft configured from two divisible bearing boxes, one of the bearing boxes being configured from a roll-side bearing box arranged on a roll main body-side and the other bearing box being configured from a shaft end-side bearing box arranged on the shaft end-side of the roll; the roll-side bearing box having a shaft sleeve covering an outer periphery of the roll shaft and an oil seal provided along an outer periphery of the shaft sleeve; and the shaft end-side bearing box having a bearing for rotatably supporting the shaft, wherein the roll-side bearing box has an oil seal consisting of an inner ring and a spring, wherein an O-ring for inhibiting infiltration of the surface treatment liquid is provided between an inner peripheral face of the shaft sleeve covering the outer periphery of the roll shaft and an outer peripheral face of the shaft, and wherein a lateral face on the roll main body-side of the shaft sleeve is in contact with the roll main body and rotates integrally with the roll shaft.

2. The roll unit to be dipped in a surface treatment liquid of a copper foil according to claim 1, wherein an O-ring for inhibiting infiltration of the surface treatment liquid is provided at a contact surface of the roll-side bearing box and the shaft end-side bearing box.

3. The roll unit to be dipped in a surface treatment liquid of a copper foil according to claim 2, wherein, after assembling the roll-side bearing box and the shaft end-side bearing box on a roll frame, the roll-side bearing box and the shaft end-side bearing box are respectively fixed with a fixing bolt.

4. The roll unit to be dipped in a surface treatment liquid of a copper foil according to claim 3, wherein a plug for discharging air that is filled within the bearing is provided to a lateral face of the shaft end-side bearing box.

5. The roll unit to be dipped in a surface treatment liquid of a copper foil according to claim 1, wherein, after assembling the roll-side bearing box and the shaft end-side bearing box on a roll frame, the roll-side bearing box and the shaft end-side bearing box are respectively fixed with a fixing bolt.

6. The roll unit to be dipped in a surface treatment liquid of a copper foil according to claim 5, wherein a plug for discharging air that is filled within the bearing is provided to a lateral face of the shaft end-side bearing box.

7. The roll unit to be dipped in a surface treatment liquid of a copper foil according to claim 1, wherein a plug for discharging air that is filled within the bearing is provided to a lateral face of the shaft end-side bearing box.

* * * * *